United States Patent [19]

Merzhanov et al.

[11] 4,217,948
[45] Aug. 19, 1980

[54] METHOD FOR PRODUCTION OF TWO-LAYER PIPE CASTING

[76] Inventors: Alexandr G. Merzhanov, ulitsa Tretya, 3, kv. 2; Alexandr R. Kachin, ulitsa Pervaya, 21, kv. 24; Vladimir I. Jukhvid, ulitsa Pervaya, 16, kv. 8; Inna P. Borovinskaya, ulitsa Tretya, 3, kv. 2; Galina A. Vishnyakova, Institutsky prospekt, 11v, kv. 127, all of Moskovskaya oblast, Chernogolovka, U.S.S.R.

[21] Appl. No.: 939,107

[22] Filed: Sep. 1, 1978

[30] Foreign Application Priority Data

Aug. 29, 1977 [SU] U.S.S.R. .............................. 2511747

[51] Int. Cl.$^2$ .......................... B22D 13/08; B29C 5/04
[52] U.S. Cl. ...................................... 164/115; 264/60; 264/80; 264/270; 264/311
[58] Field of Search .................. 164/54, 66, 114, 115, 164/91, 97; 264/60, 62, 65, 85, 310, 311, 267, 269, 270, 80

[56] References Cited

U.S. PATENT DOCUMENTS

| 3,324,933 | 6/1967 | Shewmon | 164/114 |
| 3,625,276 | 12/1971 | Considine | 164/114 |
| 3,814,168 | 6/1974 | Royer | 164/114 |
| 4,005,741 | 2/1974 | Juganson | 164/54 |

FOREIGN PATENT DOCUMENTS

| 536402 | 1/1957 | Canada | 164/53 |
| 367359 | 2/1932 | United Kingdom | 164/54 |

Primary Examiner—W. E. Hoag
Attorney, Agent, or Firm—Ladas & Parry

[57] ABSTRACT

A method for the production of two-layer pipe casting is carried out in the following manner. First, a reaction chamber is filled with an initial mixture. Then, the reaction chamber with the initial mixture is set in rotation about its longitudinal axis whereupon the centrifugal acceleration of the reaction chamber is brought up to about 300 to about 1000 g. The initial mixture is then inflamed and centrifugal acceleration is gradually brought down to about 50 to about 100 g for a time period sufficient to enable combustion of the initial mixture as well as subsequent separation of the resultant melt into two layers, external and internal, until their solidification. The separation of the melt composed of the final products of combustion into two layers takes place under the action of centrifugal forces due to the difference in specific weights of said layers. In the course of crystallization of the pipe external and internal layers, as well as during their subsequent cooling, centrifugal acceleration is maintained constant.

4 Claims, No Drawings

METHOD FOR PRODUCTION OF TWO-LAYER PIPE CASTING

BACKGROUND OF THE INVENTION

1. Field of the Application

The present invention relates to metallurgy, and more particularly, to a method for the production of two-layer pipes.

The products of this invention can be advantageously used in the chemical industry in the manufacture and shipment of acids and alkalies under conditions of high temperature and pressure, in the transportation of molten metals, such as aluminum melt, for long distances, as well as in the transportation of abrasive dispersion media, such as $SiO_2$, SiC, etc.

At present, the production of pipe casting is rather complicated procedure which includes the stages of melting the materials required for different layers in a melting furnace, pouring the resultant melts into a centrifugal apparatus, and centrifugal forming of an internal layer and then of an external layer; it also involves substantial expences required for the melting equipment and electric power.

In a number of cases a finished pipe is used as the external layer of a two-layer pipe. The production of this type of pipe is likewise complicated in that it includes the stages of melting the material for the pipe internal layer in a melting furnace, pouring the resultant melt into a rotational tube, and effecting centrifugal formation of the internal layer; the production process also involves great expense for the melting equipment, and requires considerable consumption of electric power and of an initial material.

It is therefore expedient to render the production of two-layer pipes more simple and economical.

2. Description of the Prior Art

For example, there is known a method for producing two-layer pipes in a centrifugal apparatus (cf. L. A. Appen, High-Temperature-Resistant Inorganic Coatings, "Chemistry", 1967, /in Russian/), which consists in that a molten metal, such as stainless steel, is poured into a rotating metal tube and is then spread under the action of centrifugal forces over the surface of the metal tube to thereby closely adhere thereto. The production of pipes according to the above-described method is both inefficient and unprofitable, since it requires great expenditures for the melting equipment and initial material, it also involves additional expense for the transportation of the melt to centrifugal apparatus, as well as for electric power.

There is also known a method for producing two-layer pipes (cf. USSR Inventor's Certificate No. 97637, cl. B22 13/02), which comprises the stages of pouring molten steel into a centrifugal apparatus, cooling the melt formed as a cylinder-shaped layer to a temperature of 1320° to 1350° C., subsequent pouring of ferrosilicide or of stainless steel onto the first layer, and cooling down the finished two-layer pipe.

The production of pipes in accordance with the method described in the patent referred to above is complicated and unprofitable. As in previous cases, it involves appreciable expense for the costly melting equipment and initial material, as well as for the electric power input and transportation of the melt to a centrifugal apparatus.

U.S. Pat. No. 4,005,741 discloses a method for the production of multilayer pipes, which comprises successive introduction into a rotational tube of a powdery heat-insulating material, such as $Al_2O_3$ or $SiO_2$, and then of a powdery mixture of aluminum with iron oxide (thermit mixture) in a weight ratio of the heat-insulating material to thermit mixture of 1:10; the thermit mixture is subsequently ignited by means of electric-arc welding with the droplets of the melted-down electrode. Centrifugal acceleration is kept within the range of 83 to 89 g and is thereafter maintained constant until separation of the iron melt and aluminum oxide into two layers, followed by their solidification. The operating process is effected under atmospheric pressure.

The pipe produced according to the method described above is nonuniform in thickness due to uneven distribution of the initial mixture over the surface of the rotational tube wherein said mixture is introduced. In addition, the delivery of the initial mixture to the rotational tube requires a special flow-metering device which adds to the cost of the production process.

The internal layer of the pipe, produced in accordance with the above-described method and composed of $Al_2O_3$, tends to be porous because of vigorous evaporation of aluminum, occurring during its combustion when effected under atmospheric conditions, as well as by reason of insufficiently high centrifugal acceleration enabling the removal of gaseous aluminum.

The intermediate layer of the pipe, composed of iron resulting from the reaction, is contaminated with oxygen contained in the atmosphere and entering into reaction with the molten iron, which leads to the brittleness of the multilayer pipe.

The method of the patent referred to above makes it impossible to produce multilayer pipes from the mixture of oxides of transition metals with a reducing agent, such as Al or Mg, the reaction heat of which, and, consequently, the combustion temperature, are very high (3500° to 4500° C.); under atmospheric conditions the combustion is fraught with explosions and expulsion of the reaction mass.

In addition, the above method fails to provide for good bonding between the pipe layers due to the absence of the Van der Waals force between the metals forming the pipe intermediate layer and the oxides forming the pipe internal layer.

This method makes use of finished pipes as the initial material which, needless to say, is rather costly.

According to another embodiment of the above-described method, the production of two-layer pipes is carried out without resorting to the use of finished metal tubes. In accordance with this embodiment, a reaction chamber is filled with an initial mixture composed of iron and aluminum oxides. The mixture is then inflamed after being set in rotation about the longitudinal axis of the reaction chamber. Under the action of centrifugal force the resultant melt is separated into two layers, external and internal, due to the difference in specific weights of the final products of combustion. The initial mixture is inflamed at a rotating speed of 83 to 98 g, which is maintained constant until crystallization of the melt layers.

The pipe made according to the said method is nonuniform in thickness due to the uneven distribution of the initial mixture in the process of introducing it to the rotational tube. Furthermore, the delivery of the initial mixture to the rotational tube requires a special flow-metering device which increases the cost of the production process.

The internal layer of the pipe produced in accordance with the above-described method and composed of $Al_2O_3$ tends to be porous due to the intensive evaporation of aluminum during combustion under atmospheric conditions, and also due to insufficiently high centrifugal acceleration facilitating the removal of gaseous aluminum.

The external layer of the pipe consisting of iron formed during the combustion of the initial mixture, is contaminated with oxygen which is present in the atmosphere and reacts with the melted iron, as a result of which a brittle multilayer pipe is produced.

The method does not make it possible to obtain two-layer pipes from a mixture of oxides of transition metals with a reducing agent, such as Al or Mg, the reaction heat of which and consequently, the combustion temperature, are very high (3500°-4500° C.), and under atmospheric conditions, the combustion is fraught with explosions and expulsion of the reaction mass.

The method does not ensure a durable bonding between the pipe layers due to the absence of the Van der Waals force between the metal layer and the oxide layer.

It is therefore an object of the present invention to enhance efficiency and simplify the production process of a method for producing two-layer pipe casting.

Another object of the invention is to improve quality of two-layer pipe casting by removing porosity in the pipe internal layer, enabling stronger bonding between the internal and external layers of the pipe casting and ensuring uniform thickness of the two layers.

Still another object of the invention is to enhance chemical resistance of two-layer pipe casting to corrosive media at a temperature of 1500° to 2500° C.

SUMMARY OF THE INVENTION

In accordance with the foregoing and other objects and features of the invention there is provided a method for producing two-layer pipe casting, which comprises the steps of filling a reaction chamber with an initial mixture, inflaming said mixture, causing said mixture to rotate about the longitudinal axis of the reaction chamber wherein the melt resultant from the initial mixture is separated under the action of centrifugal forces into two layers, internal and external, due to the difference in specific weights of the final products of combustion, the rotation of said initial mixture being effected until solidification of said layers, wherein, according to the invention, at the moment of inflammation of the initial mixture the centrifugal acceleration is maintained within the range of from about 300 to about 1000 g to be thereafter gradually slowed down to about 50 to about 100 g for a time period sufficient to enable combustion of the initial mixture as well as subsequent separation of the melt into the layers while maintaining centrifugal acceleration constant until solidification of said layers.

Such conditions of rotation ensure, on the one hand, practically complete separation of the resultant melt into two layers of uniform thickness throughout the pipe length due to sufficiently high rate of centrifugal acceleration, permitting, on the other hand, strong bonding between two layers resulting from interpenetration of their materials in a narrow transition zone due to gradual decrease in acceleration.

By bringing down centrifugal acceleration in a manner described above, the time of separation of the melt into two layers is adjusted so that it becomes equal or slightly in excess of the time required for cooling the oxide of a reducing agent to a crystallization temperature.

Thus, a transition zone is formed at the interface of the pipe layers, wherein the materials of said layers interpenetrate to thereby provide for strong bonding therebetween.

With the ratio of the melt separation time to the melt cooling time being slightly less that one, transition zone is not formed, the pipe layers have no bonding with each other and are thus separated into two independent pipes.

If, however, the ratio of the melt separation time to the melt cooling time is well in excess of one, the melt will be not separated into two layers, which, in turn, will result in the production of a one-layer pipe.

Furthermore, with the above-indicated conditions of rotation the pipe internal layer composed of the oxide of a reducing agent is practically free from porosity owing to the fact that the gaseous products formed during combustion of the initial mixture are swiftly passed off to a free void formed due to a substantial difference in densities of the melt and initial mixture at a time when centrifugal acceleration is still rather high.

It is known that the rate of removal of gas bubbles from the melt depends on centrifugal acceleration, i.e. it increases proportionally with centrifugal acceleration.

Any conventional mixture employed for producing refractory inorganic materials can be used as the initial mixture composed of the oxides of metals belonging to groups IV—VI of the Periodic system, of a reducing agent selected from the group consisting of Al, Mg, Zr and Ti, and a non-metal selected from the group consisting of C, B and Si or of the non-metal metal oxides. The cast refractory inorganic materials are produced in a reaction chamber in the presence of an inert gas or nitrogen with the excess pressure inside said chamber being maintained within the range of 1 to 100 atm.

The employment of said mixture permits the production of two-layer pipe casting with the external layer thereof being formed of refractory inorganic materials, such as carbides, borides, silicides, nitrides of transition metals, and with the internal layer thereof being formed of the oxides of reducing agents having high chemical resistance to corrosive media, such as acids, alkalies, etc., at 1500° to 2500° C.

It is preferable that the oxide of a reducing agent, formed in the process of making a cast refractory inorganic material, be additionally introduced into the initial mixture in an amount of 5 to 25 percent by weight of the initial mixture, the centrifugal acceleration at the moment of inflammation of said mixture ranging from about 300 to 1000 g to be maintained constant for a time period sufficient to enable combustion of the initial mixture as well as separation of the melts of the refractory inorganic material and of the oxide of a reducing agent into two layers until their solidification.

The introduction of the oxide of a reducing agent into the initial mixture permits, at constant centrifugal acceleration, strong bonding between the pipe layers to be obtained due to interpenetration of the materials of said layers in a narrow transition zone. There takes place practically complete separation of the melts into two layers.

It is also preferable that the refractory inorganic material formed in the process of making a cast refractory inorganic material be additionally introduced into the initial mixture in an amount of 5 to 25 percent by weight of the initial mixture, the centrifugal acceleration at the moment of inflammation of said mixture ranging from about 300 to about 1000 g to be maintained constant for a time period sufficient to enable combustion of the initial mixture as well as separation of the melts of the refractory inorganic material and of the oxide of a reducing agent into two layers until their solidification.

The introduction of the refractory compound into the initial mixture permits, at constant centrifugal acceleration, strong bonding between the pipe layers to be obtained due to interpenetration of the materials of said layers in a narrow transition zone. There takes practically complete separation of the melts into two layers.

The method according to the invention for producing two-layer pipe casting is carried out in the following manner.

The interior of a reaction chamber is filled with an initial mixture which is then set in rotation about the longitudinal axis of the reaction chamber at a centrifugal acceleration of from about 300 to about 1000 g. Thence, the initial mixture is inflamed and the centrifugal acceleration is gradually brought down to about 50 to about 100 g throughout the process of combustion of the initial mixture and during subsequent separation of the melt into two layers, and is then maintained constant until solidification of the layers.

In a simple case chemical conversion of such mixture may be written as $$A_1 + A_2 \rightarrow B_1 + B_2,$$

where $A_1$ is the iron oxide $A_2$ is the reducing agent: Al, Mg $B_1$ is iron $B_2$ is the oxide of the reducing agent: $Al_2O_3$ and MgO.

In the event of using the mixture for making cast inorganic refractory materials as the initial mixture, the formula of chemical transformation will be expressed as $$A_3 + A_4 + A_5 \rightarrow B_3 + B_4,$$

where $A_3$ is the oxide of metals belonging to groups IV—VI of the Periodic system, such as $MoO_3$, $WO_3$, $V_2O_5$, $CrO_3$, $TiO_2$, etc., $A_4$ is the reducing agent selected from the group consisting of Al, Mg, Zr, Ti;

$A_5$ is the nonmetal selected from the group consisting of C, B, Si, or the oxide of nonmetal $B_2O_3$, $SiO_2$;

$B_3$ is the refractory compound: WC, $Cr_3C_2$, $Mo_2C$, VC, TiC, $CrB_2$, MoB, $VB_2$, $TiB_2$, $WSi_2$, $CrSi_2$, $V_2N$, TiN, etc.;

$B_4$ is the oxide of a reducing agent: $Al_2O_3$, MgO, $TiO_2$, $SiO_2$.

The initial mixture is inflamed at one of the ends of the combustion chambers by means of tungsten filament electrically heated to a high temperature. After a small portion of the mixture is inflamed, the tungsten filament is deenergized, whereupon the combustion front spontaneously spreads over the mixture. In the process of combustion the initial mixture is decomposed into final products.

Because of the high temperature developed in the combustion front, exceeding the melting temperature of the initial and final products, the former and the latter are melted down. Especially high temperature is developed during combustion of the mixtures of transition metals with a reducing agent and a nonmetal or its oxide, which goes up above 3000° to 4500° C. This temperature exceeds the boiling point of such reducing agents as Al, Mg, which gives rise to vigorous gas formation in the process of combustion. The formation of gas during combustion also takes place due to the formation of carbon monoxide, suboxides, as well as due to the evaporation of boric oxide. Under atmospheric pressure the formation of gas during combustion is fraught with explosions and expulsion of the reaction mass. Elevated pressure permits gas formation to be drastically reduced and the throwing-out and explosion of the reaction mass to be eliminated. Under a pressure of 100 atm., gas formation is suppressed in practically all mixtures.

Furthermore, elevated pressure makes it possible to materially decrease porosity in the internal oxide layer of a two-layer pipe, which is ordinarily caused by the formation of gas bubbles in the oxide layer after its solidification.

The final products of combustion, metals and oxides or refractory compounds and oxides, are practically not dissolved in one another and have different specific weights, whereby they become liable to separation under the effect of centrifugal forces. The mode of rotation and the rate of centrifugal acceleration should be selected such that they would enable, on the one hand, separation of a refractory compound or the oxide of a reducing agent into two layers, as well as ensure strong bonding of the pipe layers, on the other.

These two conditions are fulfilled provided the time period required for separation of the melt in two layers is slightly in excess of that needed for cooling the melt to a temperature of crystallization of the oxide of a reducing agent. This being the case, a narrow transition zone is formed to preclude the separation of the oxide of a reducing agent and a metal or its refractory compound, thereby ensuring strong bonding of the pipe layers undergoing practically complete separation into two layers. These ends are accomplished in several ways.

For example, centrifugal acceleration is brought up at the moment of combustion to about 300 to about 1000 g and is thereafter gradually brought down to about 50 to about 100 g throughout the process of combustion and during subsequent separation of a refractory compound and of the oxide of a reducing agent into two layers.

Alternatively, the metal oxide of a reducing agent or the oxide of a reducing agent, resultant from the initial mixture, are introduced into the latter in an amount of 5 to 25 percent by weight thereof, while inflammation is effected at centrifugal acceleration of about 300 to about 1000 g, which is maintained constant.

In case the time needed for the separation of the melt into two layers is slightly less than that needed for cooling the melt to the temperature at which solidifies the oxide of a reducing agent, the transition zone is not formed, the pipe layers develop no bonding therebetween and are thus easily separate into two independent pipes.

This occurs when the inflammation of the initial mixture is effected at a centrifugal acceleration of about 300 to about 1000 g which is then maintained constant throughout the process of combustion of the initial mixture as well as during subsequent separation of the melt of the final products into two layers, and during solidification of the melts.

With the time needed for the separation of the melt into two layers being well in excess of the time needed for the melt to cool down to the crystallization temperature of the oxide of a reducing agent, the separation of the melt into two layers does not take place; instead, a one-layer pipe is formed to have crystalline particles of metal or of its refractory compound distributed in oxide matrix thereof.

The invention will be further described by the following illustrative Examples.

EXAMPLE 1

A two-layer pipe casting is produced to have its external layer formed of iron and its internal layer formed of aluminum oxide.

A mixture of powdery aluminum and iron oxide is charged into a graphite reaction chamber of a centrifugal apparatus. Then, argon gas is fed to the reaction chamber and a pressure of 100 atm is built up therein. The reaction chamber is set in rotation about its longitudinal axis and centrifugal acceleration is then brought up to about 1000 g. At this acceleration the initial mixture is inflamed. Thereafter, centrifugal acceleration is gradually brought down to about 50 g for a time period of 2 min, which is then maintained constant for 5 min. Thence, the centrifugal apparatus is brought to a stop and, upon complete cooling, the finished two-layer pipe casting is withdrawn therefrom, having its external layer formed of iron and its internal layer of aluminum oxide. The internal and external layers of the pipe are in strong bonding with each other.

Other characteristics of the two-layer pipe produced in accordance with the method of the invention are given in Table below.

EXAMPLE 2

A two-layer pipe casting is produced to have its external layer formed of molybdenum carbide and its internal layer of aluminum oxide.

A mixture of powders of molybdenum oxide, aluminum and carbon is charged into the interior of a reaction chamber of a centrifugal apparatus and is compacted therein. Then, argon gas is fed to the chamber and a pressure of 100 atm is built up therein. The reaction chamber is thereafter set in rotation about its longitudinal axis and centrifugal acceleration is brought up to 300 g. At this acceleration the initial mixture is inflamed, whereupon centrifugal acceleration is gradually brought down to about 50 g for a time period of 2 min and is then maintained constant for 2 min. Then, the centrifugal apparatus is brought to a stop and, upon complete cooling, the finished two-layer pipe casting is withdrawn therefrom, having its external layer formed of molybdenum carbide and its internal layer of aluminum oxide.

The internal and external layers of the pipe are in strong bonding with each other. Other characteristics of the two-layer pipe produced in accordance with the method of the invention are given in Table below.

EXAMPLE 3

A two-layer pipe casting is produced to have its external layer composed of 85 percent of tungsten carbide and 15 percent of cobalt and its internal layer formed of aluminum oxide. The process conditions, the composition of the initial mixture used, as well as the characteristics of the two-layer pipe casting produced in accordance with the method of the invention are given in Table below.

EXAMPLE 4

A two-layer pipe casting is produced to have its external layer formed of chromium boride and its internal layer of titanium oxide. The process conditions, the composition of the initial mixture used, as well as the characteristics of the two-layer pipe casting produced in accordance with the method of the invention are given in Table below.

EXAMPLE 5

A two-layer pipe casting is produced to have its external layer formed of the mixture of titanium and molybdenum carbides and its internal layer of zirconium oxide. The process conditions, the composition of the initial mixture used, as well as the characteristics of the two-layer pipe casting produced in accordance with the method of the invention are given in Table below.

EXAMPLE 6

A two-layer pipe casting is produced to have its external layer formed of molybdenum boride and its internal layer of magnesium oxide.

The process conditions, the composition of the initial mixture used, as well as the characteristics of the two-layer pipe casting produced in accordance with the method of the invention are given in Table below.

EXAMPLE 7

A two-layer pipe casting is produced to have its external layer formed of vanadium carbide and its internal layer of aluminum oxide. The process conditions, the composition of the initial mixture used, as well as the characteristics of the two-layer pipe casting produced in accordance with the method of the invention, are given in Table below.

EXAMPLE 8

A two-layer pipe casting is produced to have its external layer formed of molybdenum carbide and its internal layer of aluminum oxide. A mixture of powders of aluminum, carbon and molybdenum oxide and aluminum oxide is charged into a graphite reaction chamber. Then, argon gas is fed into said chamber and a pressure of 100 atm is built up therein. Thereafter, the chamber is set in rotation about its longitudinal axis and centrifugal acceleration is brought up to reach 300 g. At this acceleration the initial mixture is inflamed and centrifugal acceleration thereof is maintained constant for a time period of 10 min. The centrifugal apparatus is thereafter brought to a stop and, upon complete cooling, a two-layer pipe casting is produced to have its external layer formed of molybdenum carbide and its internal layer of aluminum oxide.

The external and internal layers of the pipe are in strong bonding with each other.

Other characteristics of the two-layer pipe produced in accordance with the method of the invention are given below.

EXAMPLE 9

A two-layer pipe casting is produced to have its external layer formed of molybdenum carbide and its internal layer of aluminum oxide.

This example differs from the previous one in that molybdenum carbide in an amount of 25 percent is substituted for the aluminum oxide introduced into the initial stoichiometric mixture. In this case the external and internal layers of the pipe have strong bonding.

EXAMPLE 10

A two-layer pipe casting is produced to have its external layer formed of chromium boride and its internal layer of titanium oxide.

The process conditions, the composition of the initial mixture, as well as the characteristics of the two-layer pipe casting produced in accordance with the method of the invention are given in Table below.

EXAMPLE 11

A two-layer pipe casting is produced to have its external layer formed of chromium boride and its internal layer of titanium oxide.

This example was carried out in a manner similar to that described in Example 10.

EXAMPLE 12

A two-layer pipe casting is produced to have its external layer formed of molybdenum carbide and its internal layer of aluminum oxide.

This example differs from Example 1 in that after the initial mixture is inflamed, centrifugal acceleration is maintained at about 300 g. In this case the external and internal layers of the pipe have no bonding and are thus separated into two independent pipes.

EXAMPLE 13

A two-layer pipe casting is produced to have its external layer formed of chromium boride and its internal layer of titanium oxide. The process conditions, the composition of the initial mixture, as well as the characteristics of the two-layer pipe casting produced in accordance with the invention are given in Table below.

TABLE

Production Process and Characteristics of Two-Layer Pipe Casting

| No | Materials for external and internal layers produced in accordance with the method of the invention | Composition of initial mixture | Pressure atm | Rotating conditions, G | X-ray phase composition external | X-ray phase composition internal | Bonding of layers | Melting temperature, °C external | Melting temperature, °C internal |
|---|---|---|---|---|---|---|---|---|---|
| 1 | 2 | 3 | 4 | 5 | 6 | 7 | 8 | 9 | 10 |
| 1 | Aluminum ferric oxide | 216 g FeO<br>246 g Fe<br>54 g Al | 100 | Altern. from 1000 to 50 | Fe | Al$_2$O$_3$ | Strong | 1590 | 2030 |
| 2 | Molybdenum carbide-aluminum oxide | 288 g MoO$_3$<br>108 g Al<br>12 g C | 100 | Altern. from 300 to 50 | Mo$_2$C | Al$_2$O$_3$ | Strong | 2690 | 2030 |
| 3 | Tungsten carbide with cobalt link - aluminum oxide | 232 g WO$_3$<br>62 g CoO<br>69 g Al<br>12 g C | 5 | Altern. from 1000 to 100 | WC—W$_2$-C—Co | Al$_2$O$_3$ | Strong | 2700 | 2030 |
| 4 | Chromium boride - titanium oxide | 200 g CrO$_3$<br>144 g Ti<br>44 g B | 1 | Altern. from 1000 to 100 | CrB$_2$ | TiO$_2$ | Strong | 2200 | 1835 |
| 5 | Titanium and molybdenum carbides - zirconium oxide | 80 g TiO$_2$<br>288 g MoO$_3$<br>368 g Zr<br>24 g C | 50 | Altern. from 300 to 50 | TiC—Mo$_2$C | ZrO$_2$ | Strong | 2800 | 2677 |
| 6 | Molybdenum boride - magnesium oxide | 288 g MoO$_3$<br>140 g Mg<br>14 g B | 100 | Altern. from 1000 to 100 | MoB | MgO | Strong | 2550 | 2800 |
| 7 | Vanadium carbide-aluminum oxide | 546 g V$_2$O$_5$<br>270 g Al<br>90 g C | 100 | Altern. from 1000 to 100 | VC | Al$_2$O$_3$ | Strong | 2850 | 2030 |
| 8 | Molybdenum carbide-aluminum oxide | 288 g MoO$_3$<br>108 g Al<br>12 g C<br>102 Al$_2$O$_3$ | 100 | Constant 300 | Mo$_2$C | Al$_2$O$_3$ | Strong | 2690 | 2030 |
| 9 | Molybdenum carbide-aluminum oxide | 288 g MoO$_3$<br>108 g Al<br>12 g C<br>102 g Mo$_2$C | 100 | Constant 300 | Mo$_2$C | Al$_2$O$_3$ | Strong | 2690 | 2030 |
| 10 | Chromium boride - titanium oxide | 200 g CrO$_3$<br>144 g Ti<br>44 g B<br>38.8 g TiO$_2$ | 1 | Constant 1000 | CrI$_2$ | TiO$_2$ | Strong | 2200 | 1835 |
| 11 | Chromium boride - titanium oxide | 200 g CrO$_3$<br>144 g Ti<br>44 g B<br>38.8 g CrB$_2$ | 1 | Constant 1000 | CrB$_2$ | TiO$_2$ | Strong | 2200 | 1855 |
| 12 | Molybdenum carbide-aluminum oxide | 288 g MoO$_3$<br>108 g Al<br>12 g C | 100 | Constant 300 | Mo$_2$C | Al$_2$O$_3$ | No bonding | 2690 | 2030 |
| 13 | Chromium boride-titanium oxide | 200 g CrO$_3$<br>144 g Ti<br>44 g B | 1 | Constant 1000 | CrB$_2$ | TiO$_2$ | No bonding | 2200 | 1835 |

The internal and external layers of the pipe are in strong bonding with each other.

What is claimed is:

1. A method for producing a two-layer pipe comprising the steps of filling a reaction chamber with an initial mixture comprising oxides of metals and reducing agents therefor in powdered form; causing said mixture to rotate about the longitudinal axis of said reaction chamber with a centrifugal acceleration of 300–1000 g., inflaming said mixture and then reducing the centrifugal acceleration at approximately a constant rate to 50–100 g. during the combustion time of the initial mixture and subsequent separation of the melt formed from the initial mixture into two layers, external and internal as a result of the differences in the specific weights and maintaining it constant until crystallization of the two layers has been completed in order to obtain a two-layer pipe casting.

2. A method for producing a two-layer pipe casting as claimed in claim 1 wherein the reducing metal oxide forming the internal layer of the pipe is introduced in an amount of 5–25% by weight of the initial mixture.

3. A method for producing a two-layer pipe casting as claimed in claim 1 wherein the material forming the external layer of the pipe is introduced in an amount of 5–25% by weight of the initial mixture.

4. A method according to any one of claims 1, 2 and 3 wherein the initial mixture is composed of a known mixture for obtaining refractory inorganic casting materials, consisting of oxides of metals in the IV–VI groups of the periodic system, a reducing agent selected from the group consisting of Al, Mg, Zr and Ti and a non-metal selected from the group consisting of C, B and Si and the non-metal oxides $B_2O_3$ and $SiO_2$; wherein refractory casting materials are obtained in the reaction chamber in the presence of an inert gas or nitrogen at a pressure of from 1–100 atm. inside said chamber.

* * * * *